United States Patent [19]
Hori et al.

[11] Patent Number: 5,375,194
[45] Date of Patent: Dec. 20, 1994

[54] METHOD AND APPARATUS FOR REDUCING DISTORTION IN A GRAPHIC PATTERN BY A THINNING PROCESS

[75] Inventors: Osamu Hori; Akio Okazaki, both of Yokohama, Japan

[73] Assignee: Kabushiki Kaisha Toshiba, Kawasaki, Japan

[21] Appl. No.: 101,822

[22] Filed: Aug. 4, 1993

Related U.S. Application Data

[63] Continuation of Ser. No. 611,676, Nov. 13, 1990, abandoned.

[30] Foreign Application Priority Data

Nov. 14, 1989 [JP] Japan ................... 1-293833

[51] Int. Cl.$^5$ ............................................. G06F 15/62
[52] U.S. Cl. ...................... 395/133; 395/136; 395/143; 382/16; 382/18; 382/54; 382/55
[58] Field of Search ............. 382/7, 9, 16, 18, 19, 382/54, 55; 395/119–121, 125–129, 140–143, 133, 136

[56] References Cited

U.S. PATENT DOCUMENTS

| | | | |
|---|---|---|---|
| 4,566,124 | 1/1986 | Yamamoto et al. | 382/21 |
| 4,885,702 | 12/1989 | Ohba | 395/119 |
| 5,131,053 | 7/1992 | Bernzott et al. | 382/9 |
| 5,208,869 | 5/1993 | Holt | 382/7 |

OTHER PUBLICATIONS

An Automatic Beautifier For Drawings And Illusrtrations Proc. ACM Siggraph '85, pp. 225–234, 1985, vol. 19, No. 3.

IBM Technical Disclosure Bulletin, vol. 18, No. 7, Dec. 1975, pp. 2339–2342, W. J. Fitzgerald, et al., "Procedure For Rectifying A Roughly Sketched Drawing".

*Primary Examiner*—Almis Jankus
*Attorney, Agent, or Firm*—Oblon, Spivak, McClelland, Maier, & Neustadt

[57] ABSTRACT

A method of beautificating a graphic pattern approximated by line segments divided by knots, includes the step (H) of moving each knot under a predetermined limited condition, the step (G) of obtaining a quality evaluation value for the graphic pattern corresponding to the moved knot, and the step (I) of obtaining a graphic pattern which corresponds to the moved knot and has a largest quality evaluation value as a beautificated graphic pattern. For all combinations of movable knots, quality evaluation values of graphic patterns corresponding to the moved knots are obtained and are compared with each other to obtain a graphic pattern having the largest quality evaluation value. Alternatively, quality evaluation values of graphic patterns are obtained upon sequential movement of the knots, and a graphic pattern having the largest quality evaluation value is obtained while sequentially selecting the moved knots corresponding to higher quality evaluation values. This invention provides a method and apparatus for beautificating line drawings.

13 Claims, 8 Drawing Sheets

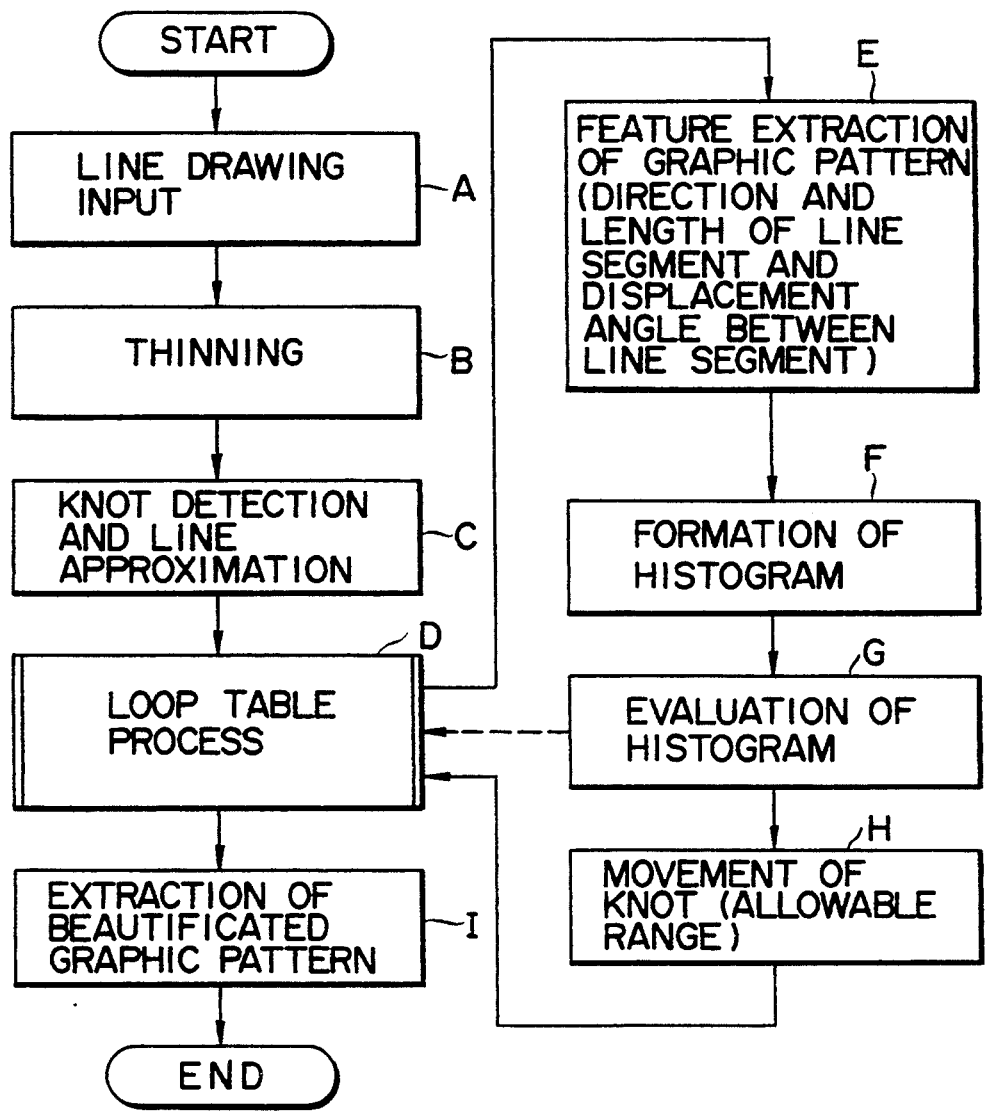
F I G. 1

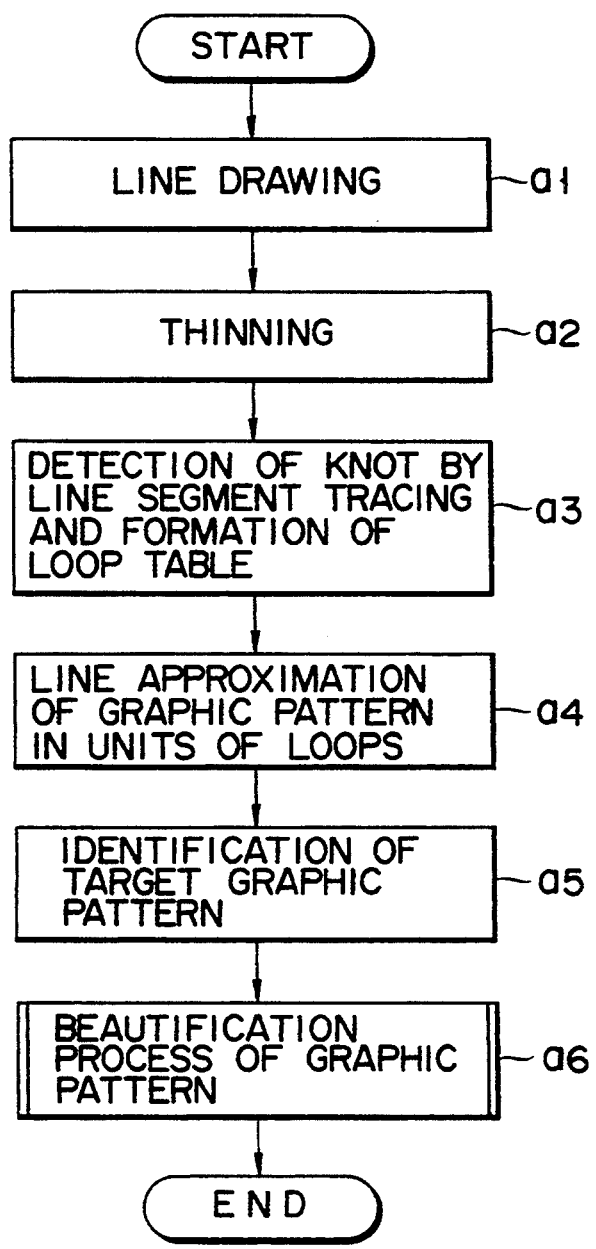
F I G. 2

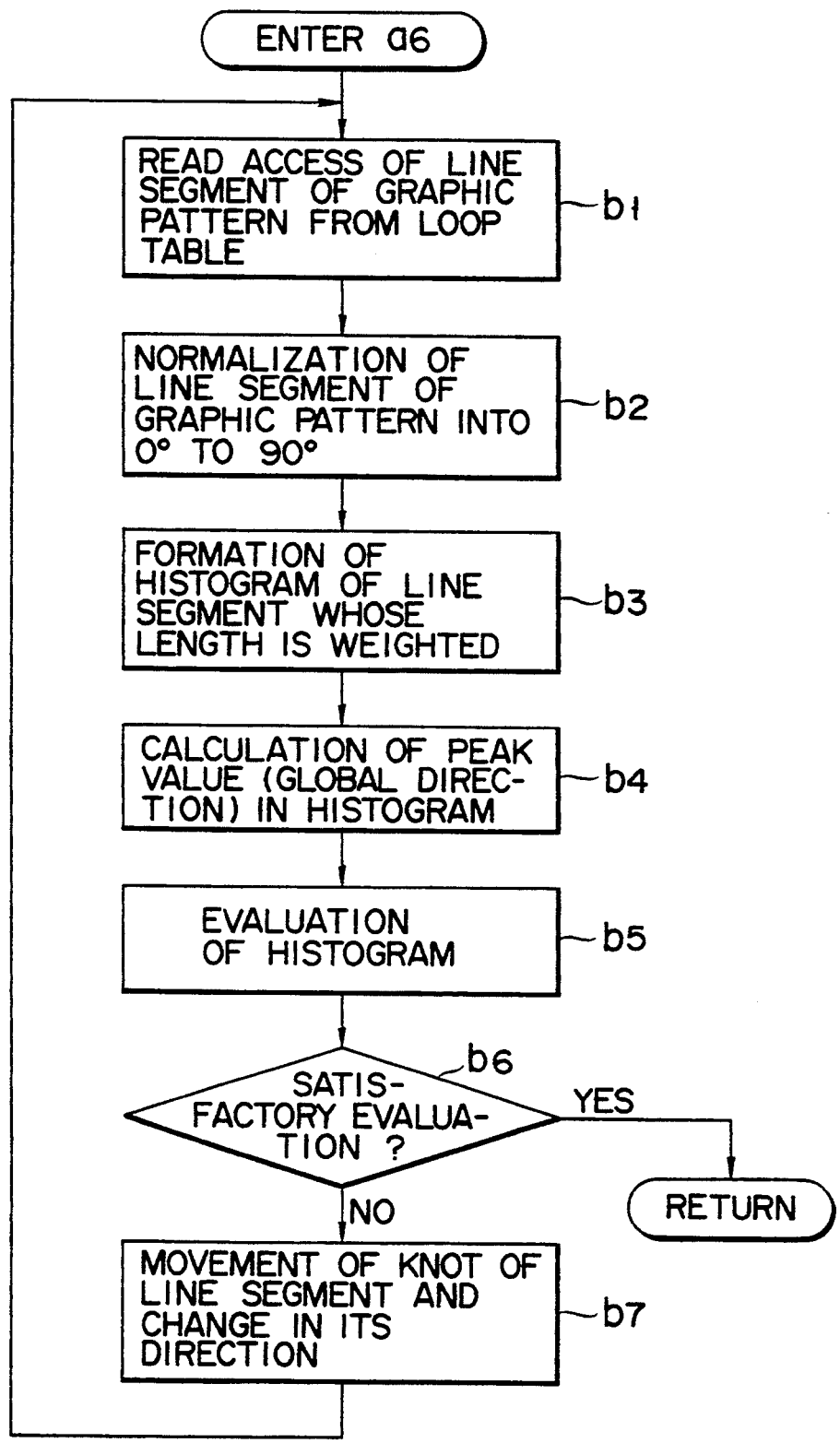
F I G. 3

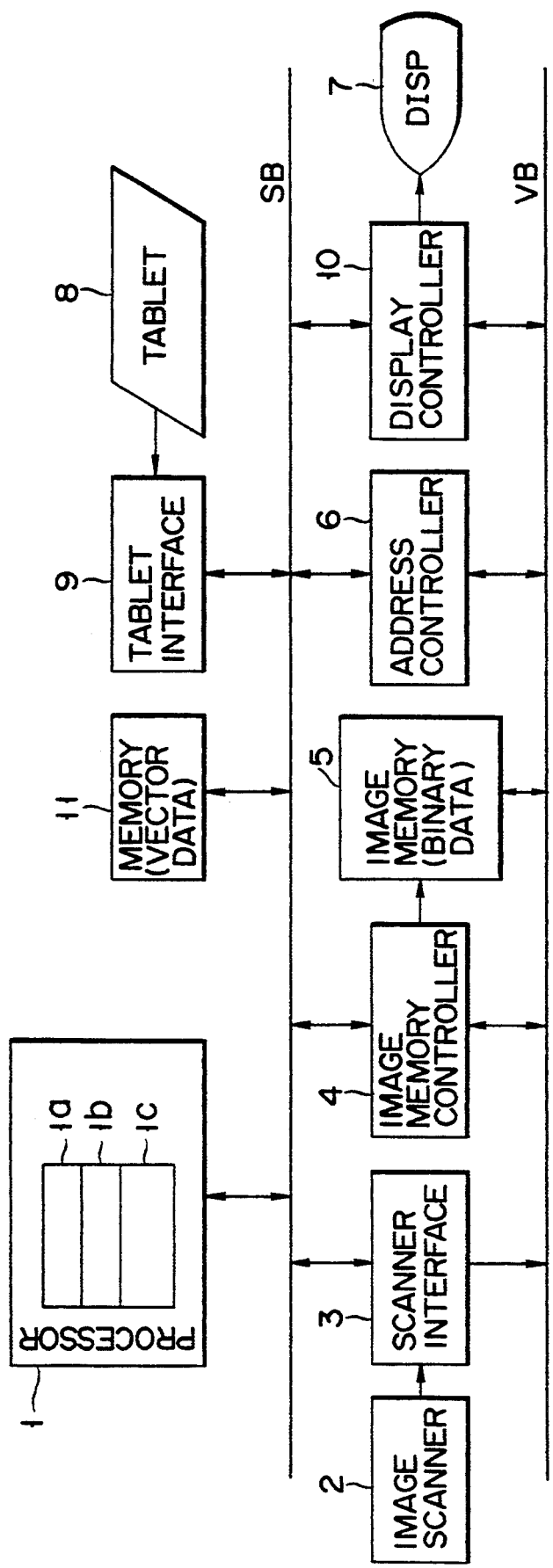
F I G. 4

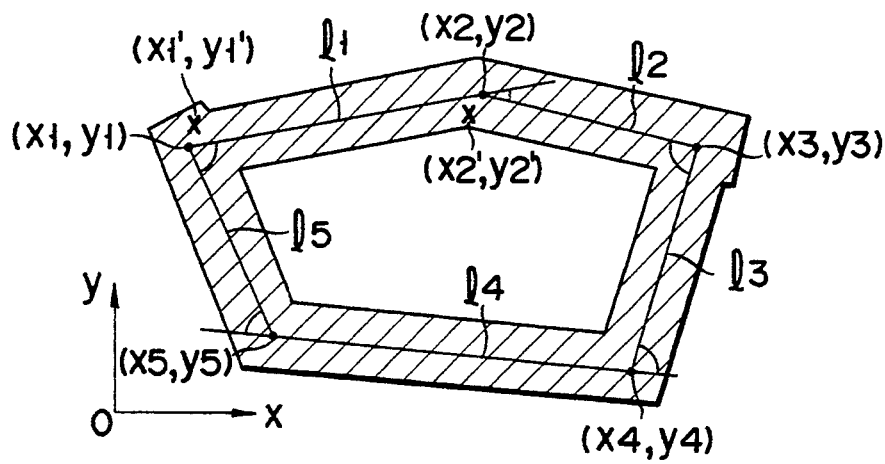
F I G. 5
| LOOP GRAPHIC PATTERN | NO. OF KNOTS | KNOT COORDINATE |
|---|---|---|
| 1 | 5 | (x1,y1) (x2,y2) (x3,y3) (x4,y4) (x5,y5) |
| 2 | 4 | (x1,y1) (x2,y2) (x3,y3) (x4,y4) |
F I G. 6

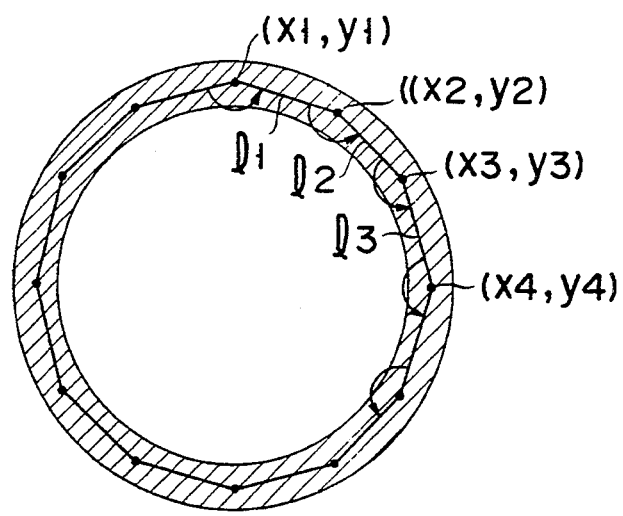
F I G. 10
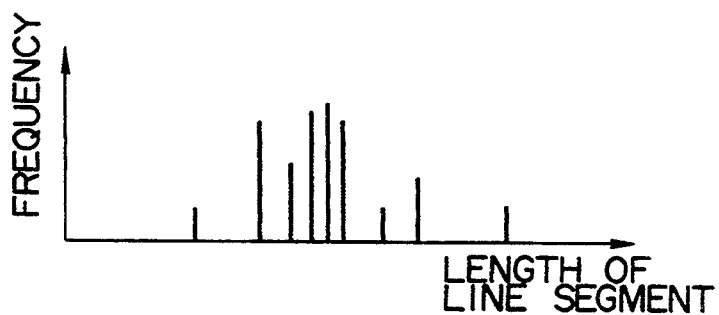
F I G. 11
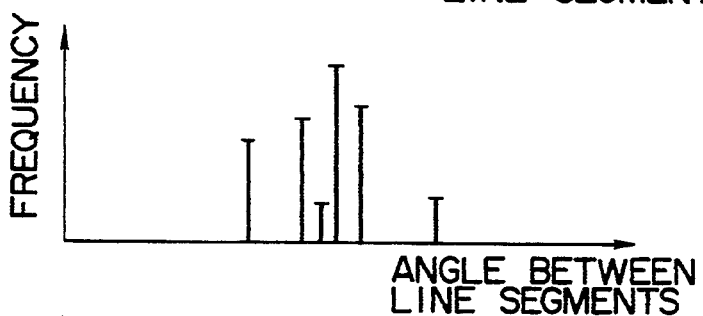
F I G. 12
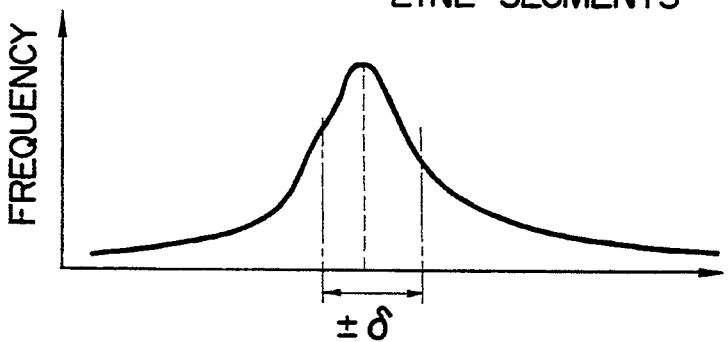
F I G. 13

METHOD AND APPARATUS FOR REDUCING DISTORTION IN A GRAPHIC PATTERN BY A THINNING PROCESS

This application is a continuation of application Ser. No. 07/611,676, filed on Nov. 13, 1990, now abandoned.

BACKGROUND OF THE INVENTION

1. Field of the Invention

The present invention relates to an apparatus for beautificating line drawings, which can effectively extract graphic data as input data to a CAD/CAM system or a geographic information management system from line drawing data.

2. Description of the Related Art

Along with recent developments in an information-oriented society, various "geographic information management systems" capable of managing complicated geographical systems such as waterworks, sewerage, and a power network in association with maps have been developed. Graphical input operations in a map database are time-consuming and expensive, as a matter of course. Various extensive studies have been made to automatically read graphic patterns illustrated in existing maps.

Since CAD/CAM systems have been very popular, a strong demand has also arisen for automatically reading graphic patterns or figures from existing design drawings. Many graphic pattern reading apparatuses have been developed to automatically extract graphic patterns such as a house from a map as a vector pattern or to read a line segment pattern from mechanical drawings.

Input data obtained by reading graphic information described in a map or mechanical drawing is adversely affected by noise components mixed in the read image data. During reading of information by an image scanner, the read graphic data are often distorted. A "modified-thinning" technique almost free from this distortion is employed in a conventional system to maintain beautification quality of graphic patterns upon removal of distortion of input read data. In particular, portions easily susceptible to distortion, such as an intersection, a corner, and a T-shaped portion constituted by line drawings, are manually beautificated. Although these conventional techniques are very effective as a means for compensating local distortions, they are not effective for global distortions. For example, a graphic pattern of a house read from a map is generally represented as a combination of orthogonal or parallel line segments. In practice, however, a graphic pattern of a house may be read and input as non-orthogonal or non-parallel line segments, or a circular graphic pattern may be read and input as an elliptical graphic pattern. Therefore, the "modified-thinning" technique cannot cope with the global distortions of graphic patterns.

As described above, in a conventional graphic pattern input apparatus (reading apparatus), although local distortions can be compensated by the "modified-thinning" technique, it is difficult to effectively correct global distortions. Therefore, several problems posed by a graphic data input apparatus for a geographic information management system, a CAD/CAM system, and the like are left unsolved.

SUMMARY OF THE INVENTION

It is therefore an object of the present invention to provide a practical method and apparatus for easily and effectively beautificating graphic data which is free from local and global distortions and which is extracted from line drawing data.

In the apparatus for beautificating graphic data according to the present invention, the following operations are performed for approximation graphic data extracted from line drawing data and obtained by line segments. These line segments are divided by knots. More specifically, each knot of a graphic pattern is moved within the range of a line width of, e.g., line drawing data under predetermined limited conditions. A quality evaluation value of this graphic pattern subjected to knot movement is obtained from a histogram of feature values of line segments approximating the graphic patterns and divided by the knots. A graphic pattern having a largest quality evaluation value by this knot movement is recognized and obtained as a beautificated graphic pattern.

Quality evaluation values of graphic patterns subjected to knot movement are obtained for all cases in which knots are movable. The resultant values are compared with each other to obtain a graphic pattern having the largest quality evaluation value. Alternatively, a quality evaluation value of each graphic pattern upon sequential movement of each knot is obtained, and a graphic pattern having the largest quality evaluation value is obtained while knots are sequentially selected so as to obtain larger quality evaluation values.

According to the present invention, each knot of an approximated graphic data extracted from the line drawing data and formed by line segments divided by knots is moved within an allowable range of the line drawing data, e.g., in the range of a line width under the predetermined limited conditions. Feature values (e.g., the direction and length of a line segment approximating each graphic pattern and divided by each knot or an angle formed by line segments at a knot) of a graphic pattern subjected to knot movement are obtained. A quality evaluation value of a graphic pattern with a knot being moved is obtained as a variance of a histogram associated with the feature values, or the ratio of points around the peak within a predetermined range of the histogram in accordance with the histogram. Therefore, the graphic pattern corresponding to the moved knot and the largest evaluation value is recognized as a beautificated graphic pattern. The knot is moved while the quality of the graphic pattern is numerically evaluated, thereby eliminating local and global distortions and obtaining a beautificated graphic pattern. That is, upon movement of a knot, a line segment line-approximating the graphic pattern is corrected to obtain beautificated graphic data from which graphic distortions are effectively eliminated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a flow chart showing a schematic sequence of beautification for line drawings;

FIG. 2 is a flowchart showing an actual flow of the overall processing sequence;

FIG. 3 is a flow chart showing beautification for a rectangular loop line drawing according to "graphic pattern modification" in FIG. 2;

FIG. 4 is a block diagram showing a schematic arrangement of an embodiment of the present invention;

FIG. 5 is a view showing a relationship between an input line drawing, knots line-approximating image data of the line drawing, and line components;

FIG. 6 is a table showing a structure of knot data stored in a loop table;

FIG. 10 is a view showing line approximation of a circular graphic pattern;

FIG. 11 is a histogram using lengths of line segments as feature values;

FIG. 12 is a histogram using angles between line segments as feature values; and FIG. 13 is a graph showing evaluation values with respect to the histogram.

DETAILED DESCRIPTION OF THE PREFERRED EMBODIMENTS

Figure 7:
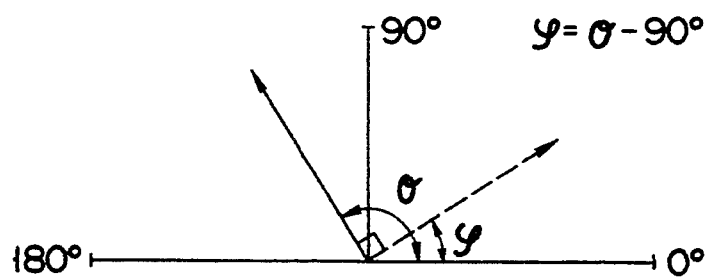
FIG. 7 is a view for explaining a normalization concept of a direction of a line segment.

FIG. 1 shows a schematic sequence of beautification for line drawings, and the processing steps are as follows.

First, a line drawing is input from a map or the like (step A). This input line image data is subjected to a thinning process (step B). The thinning process is performed by properly utilizing the "thinning" technique variously used in the field of conventional image processing. Thereafter, knots serving as feature values of a graphic pattern are detected from the thinned image data, and a line segment of the line drawing which is obtained by connecting the knots is subjected to line approximation (step C). A series of coordinate values of knots constituting the line-approximated graphic pattern is registered in a loop table. The registered data serves as line drawing data for beautification process (step D).

The series of the coordinate values of knots is stored in the loop table in units of looped graphic patterns such that the number of knots and the coordinate values of the respective knots are registered. Graphic data (i.e., the series of coordinate values of knots) subjected to the beautification process are read out from the loop table, and feature values of the corresponding graphic pattern are extracted (step E). The feature values of this graphic pattern are obtained as the directions and lengths of the line segments between knots line-approximating the looped graphic pattern, or the angles between the line segments at the respective knots. The feature values of the looped graphic pattern to be extracted are taken into consideration to form its histogram (step F). Subsequently, a variance of the histogram or a ratio of points within the predetermined range from the peak position of the histogram is obtained as a quality evaluation value for the looped graphic pattern, thereby evaluating the looped graphic pattern (step G).

On the basis of the evaluation result, each knot of the looped graphic pattern is moved within the allowable range of, e.g., a line width of the input line drawing (i.e., a line drawing prior to the thinning process) under the predetermined limited conditions (step H). The knot movement process is performed by shifting the coordinate values of the knots registered in the loop table.

The above processing steps are repeated as follows. Feature values of looped graphic patterns corresponding to knot movements are extracted, and quality evaluation of the looped graphic patterns corresponding to the moved knots is repeatedly performed from the resultant histograms. When a sufficiently large quality evaluation value is obtained, or the largest quality evaluation value is obtained, the series of coordinate values of the moved knots of the looped graphic pattern having the sufficiently large or the largest evaluation value are extracted from the loop table. These coordinate values are output as the beautificated looped graphic pattern data (step I).

The method of the present invention comprises the above steps. An apparatus is operated in accordance with these beautification steps as follows. That is, the quality of a graphic pattern upon movement of knots in evaluated from its histogram while the knots of a line-approximated looped graphic pattern are moved. A looped graphic pattern having the largest (sufficiently large) quality evaluation value upon movement of knots is obtained as the beautificated graphic pattern data.

The beautification operations will be described with reference to the flow chart in FIG. 2. In this embodiment, graphic patterns representing houses are extracted as actual input data from a map, and the extracted graphic patterns are beautificated and symbolized in accordance with practical data processing.

A scanner 2 shown in FIG. 2 is started to read and input line drawings illustrated in a map (step a1). The read and input line drawing data are stored in an image memory 5 shown in FIG. 4. A processor 1 shown in FIG. 4 starts the thinning process, and the line drawing data stored in the image memory 5 are thinned to have a line width [1] (step a2). Thereafter, vectors of the thinned line drawing data are traced, knots serving as feature values of the line drawing data are sequentially obtained, and a loop table is formed, as shown in FIG. 6 (step a3). Line approximation of line segments connecting these knots in the line drawing is performed (step a4).

Only graphic data representing a closed loop which has one inner hole and does not pass the same line again are extracted as knot information of the line drawing registered in the loop table. The number of knots of this looped graphic pattern and the series of coordinate values of these knots are registered in the loop table.

More specifically, as indicated by a hatched portion in FIG. 5, when a line drawing $\beta$ having a given line width is given, it is thinned to obtain a line drawing $\beta$ having a line width [1]. Line segments of this line drawing $\beta$ are traced to sequentially detect knot coordinate values $(x_1,y_1)$, $(x_2,y_2)$, $(x_3,y_3)$, $(x_4,y_4)$, and $(x_5,y_5)$ serving as the feature values. After line segments $l_1, l_2, l_3, l_4,$ and $l_5$ obtained by connecting these knots are obtained, the line segments $l_1, l_2, l_3, l_4$, and $l_5$ of the line drawing D are subjected to line approximation (step a4).

As a result, data of "5" as the number of knots and $(x_1,y_1), (x_2,y_2), (x_3,y_3), (x_4,y_4)$, and $(x_5,y_5)$ as the series of the coordinate values are registered in the loop table.

A target looped figure (a rectangular looped graphic pattern representing a house pattern in this case) is identified from the features of the looped graphic patterns registered in the loop table in accordance with a pattern recognition technique (step a5). Patterns which are not house patterns as the target graphic pattern are eliminated from the loop table shown in FIG. 6.

The above operations can be performed by using the thinning process technique which is popular as a conventional line drawing process technique or a line approximation process technique using feature value detection.

The beautification process for a looped graphic pattern in the loop table, i.e., an approximated looped graphic pattern formed by line segments defined by the knots, is started (step a6).

The beautification process of this looped graphic pattern is performed by, e.g., the processing steps (b1 to b7) in FIG. 3 since this embodiment exemplifies the house pattern as a rectangular looped graphic pattern.

More specifically, the beautification process is started from acquisition of information of the knots (line segments) of the target looped graphic pattern from the loop table (step b1).

The directions of line segments line-approximating the above looped graphic pattern are normalized in the range of 0° to 90° on the basis of the vector data representing the directions of these line segments (step b2). The normalization process of the directions of these line segments is based on an assumption that the target looped graphic pattern is a rectangular house pattern, and line segments constituting the looped graphic pattern are perpendicular and/or parallel to each other. The directions of line segments between the knots are obtained as 0° to 180° vectors. The line segments having the 90° to 180° directions are processed as segments having the same directions as the perpendicular and/or parallel line segments by subtracting 90° from the angles of the 90° to 180° directions, as shown in FIG. 7.

Figure 8A:
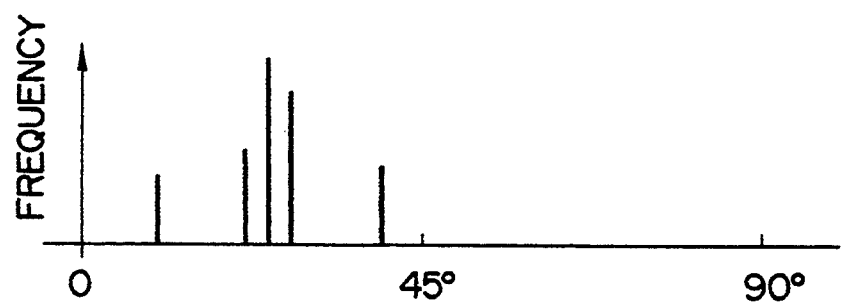
FIGS. 8A and 8B are histograms associated with directions of line segments weighted in accordance with their lengths.
Figure 8B:
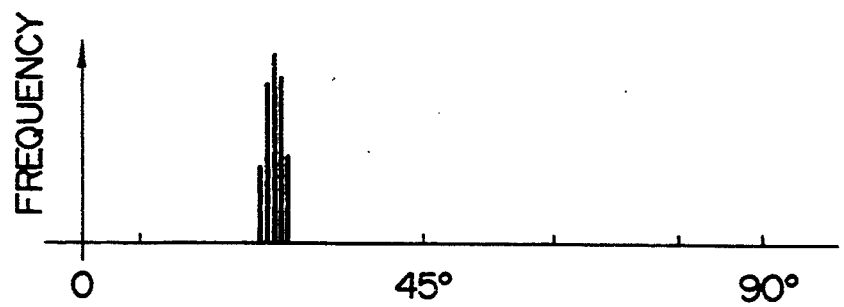

The directions of the line segments obtained in the above operations are represented in histograms shown in FIGS. 8A and 8B as weighting information based on the lengths of the line segments (step b3). The direction of the peak of the looped graphic pattern is obtained from the histogram of the distribution of directions of line segments and is defined as a "global direction" (step b4). The histogram of this looped graphic pattern is evaluated on the basis of the global direction (step b5). It is then determined whether the direction of each line segment falls within the predetermined range centered on the global direction, thereby evaluating the quality of this looped graphic pattern (step b6).

When the resultant quality evaluation value of this graphic pattern is smaller than a predetermined reference value, the knots are moved under the predetermined limited conditions, and the direction of the line segment is changed (step b7). The coordinates of each knot are sequentially moved within the range of ±n in the x and y directions, e.g., within the range of the line width of the input image data (i.e., the image prior to the thinning process). In this case, the knots are moved so that the directions of the line segments are concentrated on the global direction obtained from the histogram, thereby controlling the direction of movement of the knots.

A histogram associated with the direction of each line segment upon movement of the knot is similarly calculated. When the directions of the line segments are concentrated on the global direction represented by the peak value of this histogram, the quality of this looped graphic pattern is evaluated to be high. A graphic pattern represented by the series of coordinate values of the knots upon movement of the knots is employed as beautificated graphic data.

As described above, when the knots are moved as described above, "busyness" (variance) observed in a histogram of line segments constituting a non-beautificated graphic data obtained in FIG. 8A can be concentrated on a peak having a given direction, as shown in FIG. 8B. Therefore, the directions of the line segments of the graphic pattern representing a house pattern are uniformed, so that the graphic pattern shape can be beautificated into a rectangular shape.

Figure 9A:
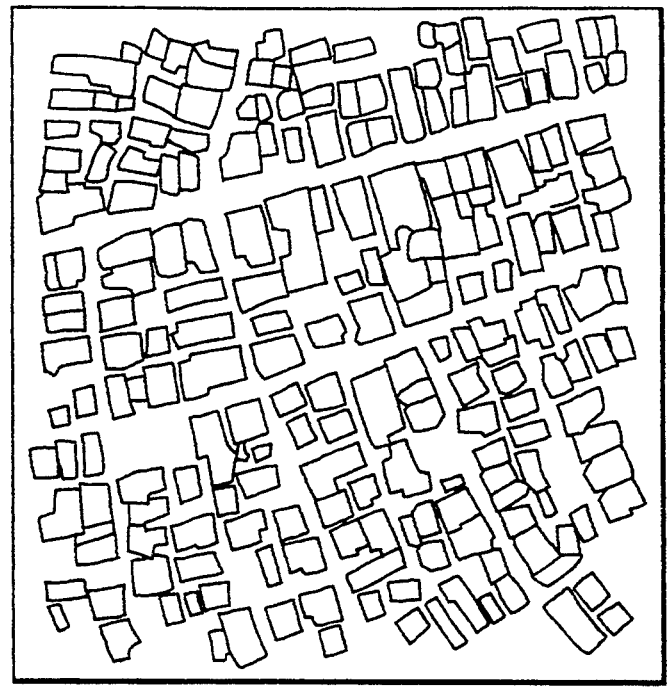
FIGS. 9A and 9B are views showing an actual original input image and a corresponding beautificated image.
Figure 9B:
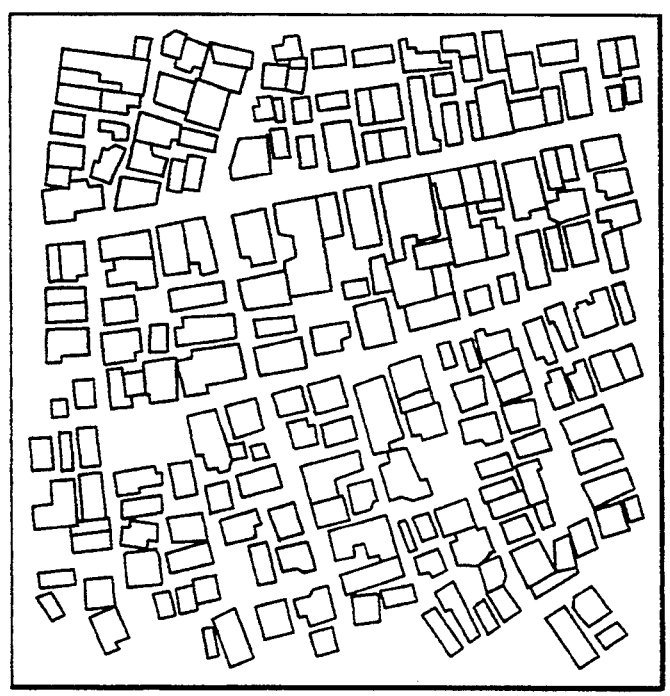

According to the beautification process of the line drawing, as described above, the read and input house pattern graphic pattern including distortions can be beautificated and output, as shown in FIG. 9B. Each house pattern is obtained as a graphic pattern surrounded by line segments basically perpendicular to each other. The graphic data can be effectively input to a CAD/CAM system or a geographic information management system. In addition, in the apparatus operated by the above method in this embodiment, the looped graphic pattern can be effectively beautificated by movement control of knots line-approximating the looped graphic pattern and the very simple numeric evaluation process calculation by evaluating graphic pattern quality based on the direction histogram obtained when the lengths of line segments upon movement of the knots are defined as weighting coefficients.

The present invention is not limited to the above embodiment described above. The above embodiment exemplifies a rectangular looped graphic pattern. When a target looped graphic pattern is a circular pattern, it can be beautificated by the following method.

As shown in FIG. 10, lengths $l_1, l_2 \ldots$ of line segments between knots are obtained as feature values of the graphic pattern, and the knots are moved to concentrate the lengths of the line segments within a predetermined range of lengths in accordance with the histogram associated with the lengths. The graphic pattern is then beautificated. Alternatively, angles between line segments at the respective knots are obtained, and the knots are moved so that these angles are concentrated within a predetermined range in accordance with a histogram associated with the angles, as shown in FIG. 12. The knots may be moved to concentrate the angles within a predetermined range, and the graphic pattern may be beautificated.

In order to evaluate the graphic quality from a histogram of feature values of a looped graphic pattern obtained by line approximation of a line drawing, a ratio of line segments falling within a predetermined range ±δ to line segments falling outside this predetermined range may be calculated to obtain an evaluation value with respect to the global direction of the line segments in the histogram as the center of the distribution. Alternatively, busyness of the histogram is used as an evaluation value. In this case, the minimum busyness value can be determined as an optimal value, and the beautification process can be performed on the basis of the optimal value.

In this embodiment, the quality is evaluated while knots are sequentially moved. However, histograms of line components for all combinations of movable knots can be obtained, and quality evaluation values obtained from these histograms can be compared with each other to obtain an optimal solution.

Various changes and modifications may be made without departing from the spirit and scope of the invention.

FIG. 4 is a block diagram showing a schematic arrangement of an apparatus for beautificating line drawings. Referring to FIG. 4, the processor 1 controls the overall operation of the apparatus. A scanner interface 3 for controlling a read operation of the scanner (e.g., an image scanner) 2, a memory controller 4 and an address controller 6, both of which controls the read/write access of data in the image memory 5, a tablet interface 9 for controlling a data input from a tablet 8, a display controller 10 for controlling a data display on a display 7 such as a CRT, a memory 11 for storing various data, and the like are connected to the processor 1 through a system bus SB.

The scanner interface 3, the image memory controller 4, the image memory 5, the address controller 6, and the display controller 10 are connected to each other through an image bus VB, and image data are exchanged between these components.

The scanner (e.g., an image scanner) 2 inputs image information such as a drawing to a computer (not shown), e.g., a CAD/CAM system or geographic information management system. For example, A1-size drawing information is optically read, and the read information is input to the computer. Line drawing information read and input by the scanner (image scanner) 2 is stored, e.g., as binary image data, from the scanner interface 3 to the image memory 5 through the image bus VB. The binary image data is actually stored in the image memory 5 upon control of addressing of the input images by the address controller 6. The image data stored in the image memory 5 is read out through the image bus VB and is output and displayed on the display (CRT) 7 under the control of the display controller 10.

A drawing input from the scanner 2 is performed by selecting and designating a menu displayed on the screen of the display 7 with a mouse (not shown), or by selecting and designating menu information (icon) displayed on a sheet of the tablet 8.

The processor 1 performs predetermined preprocessing such as the thinning process of an input image (binary (digital) image data) stored in the image memory in accordance with a command input from the tablet 8. Line approximation knots for a line drawing are obtained from the preprocessed line drawing data. Coordinate values of the knots and lines obtained by connecting these knots as line drawing image data are converted into vector data. The vector data are stored in the memory 5. In this case, by using the pattern recognition technique, a desired graphic pattern serving as a target object is extracted from the input image information, and the extracted pattern is beautificated. The memory 5 comprises a disk memory unit or the like which sequentially stores the vector data converted as described above. The vector data stored in the memory 5 are properly transferred to a computer or the like under the control of the processor 1.

The operations of the tablet 8 and the CRT 7 are controlled by the tablet interface 9 and the display controller 10 upon starting of the processor 1.

According to the present invention, the beautification for line drawings is performed by movement of knots after numerical quality evaluation of a looped graphic pattern obtained by line approximation of a line drawing. Local portions such as corners of the line drawing as well as global lines such as perpendicular and parallel lines can be effectively beautificated. As a result, a beautiful, high-quality graphic pattern can be obtained.

Since a knot placed on a given line segment can be omitted to correct fraction of line segments by movement of the knots, a good data compression effect can be expected. The method and apparatus for beautificating line drawings can provide excellent effects in practical applications of graphic beautification.

Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept as defined by the appended claims and their equivalents.

What is claimed is:

1. A method of shaping a graphic pattern, comprising the steps of:
   a) scanning a line drawing having a plurality of looped graphic patterns each formed of a plurality of input line segments with each line segment having an original segment width, generating image data corresponding to the scanned line drawing, and storing the image data in a memory;
   b) subjecting the stored image data to a thinning process for thinning each of the looped graphic patterns to obtain thinned image data corresponding to a thinned looped graphic pattern constituted by a plurality of thin line segments;
   c) detecting a plurality of knots defined as intersections of said line segments and serving as feature values of the thinned looped graphic pattern;
   d) registering coordinate data corresponding to a series of coordinates of the knots of the thinned looped graphic pattern in a loop table;
   e) detecting feature values of the thinned looped graphic pattern on the basis of the registered coordinate data read out from the loop table, the feature values representing at least one of a direction of the line segments between knots, a length of said line segments and an angle between the line segments at the knots;
   f) forming a histogram of the feature values;
   g) obtaining a quality evaluation value of the thinned looped graphic pattern from the histogram;
   h) shifting the coordinate data registered in the loop table to move at least one of the knots within the original line segment width of one of the looped graphic patterns;
   i) forming a new histogram representing the feature values of a modified thinned looped graphic pattern obtained by moving at least one of the knots;
   j) obtaining a new quality evaluation value of the modified thinned looped graphic pattern from the new histogram; and
   k) repeating the steps h) to j) a predetermined number of times to obtain graphic pattern data representative of an optimum shaped graphic pattern in which distortion introduced during scanning is reduced.

2. A method according to claim 1, wherein the step g) of obtaining a quality evaluation value includes a step of obtaining the quality evaluation value from one of a variance of the histogram and a ratio of points within a predetermined range from a peak position of the histogram.

3. A method according to claim 1, wherein the step k) includes extracting the coordinate data from the loop table when a predetermined quality evaluation value is obtained, and outputting the extracted coordinate data as shaped graphic pattern data.

4. A method according to claim 1, wherein the step a) is a step of storing image data representing a map as the line drawing.

5. A method according to claim 1, wherein the step h) of shifting the coordinate data includes a step of shifting the coordinate data to move the knots so that the lengths of the line segments are within a predetermined range of lengths.

6. A method according to claim 1, wherein the step h) of shifting the coordinate data includes a step of shifting the coordinate data to move the knots so that the angles between the line segments are within a predetermined range.

7. An apparatus for shaping a graphic pattern comprising:
means for scanning a line drawing having a plurality of looped graphic patterns each formed of a plurality of input line segments with each line segment having an original segment width and generating corresponding image data representing said line drawing;
means for storing the image data;
means for subjecting the line image data stored in said storing means to a thinning process for thinning each of the looped graphic patterns to obtain thinned image data corresponding to a thinned looped graphic pattern constituted by a plurality of thin line segments;
means for detecting a plurality of knots defined as intersections of said plurality of thin line segments and serving as feature values of the thinned looped graphic pattern;
table memory means for registering coordinate data representing a series of coordinates of the knots of the thinned looped graphic pattern;
processor means for forming an optimum shaped graphic pattern on the basis of the coordinate data read out from said table memory means, said processor means executing the operations of: detecting feature values of the thinned looped graphic pattern on the basis of the registered coordinate data read out from the table memory means, the feature values representing at least one of a direction of the line segments between knots, a length of said line segments and an angle between the line segments at the knots, forming a histogram of the feature values, obtaining a quality evaluation value of the thinned looped graphic pattern from the histogram, shifting the coordinate data registered in the table memory means to move at least one of the knots within the original line segment width of one of the looped graphic patterns, forming a new histogram of the feature values of a modified thinned looped graphic pattern obtained by moving at least one of the knots, obtaining a new quality evaluation value of the modified thinned looped graphic pattern from the new histogram, and repeating the operations from obtaining a quality evaluation value to forming a new histogram a predetermined number of times to obtain graphic pattern data representative of an optimum shaped graphic pattern in which distortion introduced during scanning is reduced.

8. An apparatus according to claim 7, wherein said scanning means includes a scanner for scanning a line drawing to read image information on the line drawing and output said image data.

9. An apparatus according to claim 7, wherein said processing means executes an operation for obtaining a quality evaluation value from one of a variance of the histogram and a ratio of points within a predetermined range from a peak position of the histogram.

10. An apparatus according to claim 7, wherein said processing means executes an operation for extracting the coordinate data from the table memory means when a predetermined quality evaluation value is obtained, and outputting the extracted coordinate data as shaped graphic pattern data.

11. An apparatus according to claim 7, wherein said inputting means includes means for inputting image data corresponding to a map as the line drawing.

12. An apparatus according to claim 7, wherein said processing means executes an operation for shifting the coordinate data to move the knots so that the lengths of the line segments are within a predetermined range of lengths.

13. An apparatus according to claim 7, wherein said processing means executes an operation for shifting the coordinate data to move the knots so that the angles between the line segments are within a predetermined range.

* * * * *